United States Patent
Ouyang

(10) Patent No.: US 11,875,274 B1
(45) Date of Patent: Jan. 16, 2024

(54) COHERENCY DETECTION AND INFORMATION MANAGEMENT SYSTEM

(71) Applicant: GOOGLE LLC, Mountain View, CA (US)

(72) Inventor: Yu Ouyang, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/100,440

(22) Filed: Jan. 23, 2023

Related U.S. Application Data

(63) Continuation of application No. 16/375,266, filed on Apr. 4, 2019, now Pat. No. 11,562,261, which is a continuation of application No. 14/937,745, filed on Nov. 10, 2015, now Pat. No. 10,282,666.

(51) Int. Cl.
 *G06N 5/04* (2023.01)
 *G06F 3/16* (2006.01)

(52) U.S. Cl.
 CPC .............. *G06N 5/04* (2013.01); *G06F 3/167* (2013.01)

(58) Field of Classification Search
 CPC .................................. G06N 5/04; G06F 3/167
 USPC ............................................. 715/727; 706/11
 See application file for complete search history.

(56) References Cited

U.S. PATENT DOCUMENTS

| | | | |
|---|---|---|---|
| 7,000,189 B2 | 2/2006 | Dutta | |
| 7,860,705 B2 | 12/2010 | Afify et al. | |
| 8,165,886 B1 | 4/2012 | Gagnon et al. | |
| 8,532,994 B2 | 9/2013 | Malegaonkar et al. | |
| 8,566,087 B2 | 10/2013 | Cross, Jr. et al. | |
| 10,282,666 B1 | 5/2019 | Ouyang | |
| 10,399,575 B2 | 9/2019 | Spasojevic | |
| 2004/0098462 A1* | 5/2004 | Horvitz | G06Q 10/107 709/207 |
| 2010/0128571 A1 | 5/2010 | Roh et al. | |
| 2011/0263859 A1 | 7/2011 | Chraime et al. | |
| 2011/0214162 A1 | 9/2011 | Brakensiek et al. | |
| 2012/0215539 A1 | 8/2012 | Juneja | |
| 2013/0135108 A1 | 5/2013 | Alameh et al. | |
| 2013/0262483 A1 | 10/2013 | Blom et al. | |
| 2013/0275875 A1* | 10/2013 | Gruber | G06F 3/167 715/728 |
| 2014/0180595 A1 | 6/2014 | Brumback et al. | |
| 2014/0231166 A1 | 8/2014 | Miller et al. | |

(Continued)

OTHER PUBLICATIONS

Knappmeyer, M. et al., "Survey of Context Provisioning Middleware". IEEE Communications Surveys & Tutorials, vol. 15, No. 3, Third Quarter 2013; 28 pages.

(Continued)

*Primary Examiner* — Stephen S Hong
*Assistant Examiner* — Broderick C Anderson
(74) *Attorney, Agent, or Firm* — Gray Ice Higdon

(57) ABSTRACT

A method may include determining, by a computing device and based on at least one user coherency factor, a user coherency level. The coherency level may include a predicted ability of a user to comprehend information. The method may also include determining, by the computing device and based on the user coherency level, information having a complexity that satisfies the predicted ability of the user to comprehend information. The method may further include outputting, by the computing device, at least a portion of the information.

19 Claims, 4 Drawing Sheets

(56) References Cited

U.S. PATENT DOCUMENTS

| | | | | |
|---|---|---|---|---|
| 2015/0053066 | A1* | 2/2015 | Hampiholi | G06V 20/597 |
| | | | | 84/602 |
| 2015/0256999 | A1 | 9/2015 | Doorandish | |
| 2016/0014262 | A1* | 1/2016 | Hodges | H04M 1/72463 |
| | | | | 455/419 |
| 2016/0019283 | A1 | 1/2016 | Gibson et al. | |
| 2016/0212268 | A1* | 7/2016 | Kansal | H04L 51/224 |
| 2016/0355190 | A1 | 12/2016 | Omi | |

OTHER PUBLICATIONS

Ahmed W., "AlarmPad Is a Customizable, Context-Based Alarm Clock App for Android", 37 pages dated Mar. 11, 2014.

AlarmPad-Alarm Clock Free-Android Apps on Google Play; http://play_google.conn/store/apps/detail?id=com.mindmeapp.alarmpad&hl=en; 4 pages; dated May 26, 2015.

AlarmPad: Customizable Context-Based Alarm Clock App for Android, http://www.addictivetips.com/android/alarmpad-customizable-context-based-alarm-clock-app-for-android/; 6 pages; dated May 26, 2015.

Adomavicious et al., "Context-Aware Recommender Systems"; Recommender Systems Handbook; 37 pages 2011.

Choujaa et al., "Activity Recognition from Mobile Phone Data: State of the Art, Prospects and Open Problems"; Context in Computing; 32 pages; dated 2014.

Morning Routine-Alarm Clock, Retreived from https://play.google.com/store/apps/details?id=net.havchr.mr2&h1=en; 3 pages; dated 2015.

Gurevych et al., "Natural Language Processing for Ambient Intelligence", Darmstadt University of Technology; 7 pages; dated 2007.

What's new with Auto-Away in the Nest Learning Thermostat software version 4.0.2/4.03.03? Retrieved from https://nest.com/support/article/What-s-new-with-Auto-Away-in-the-Nest-Learning-Thermostat-software-version-4-0-2-4-0-3; 4 pages, dated May 26, 2014.

Gao et al., "User Daily Activity Pattern Learning: A Multi-memory Modeling Approach", Neural Networks (IJCNN); 7 pages 2014.

Miika Valtonoen, "Technologies for Smart Environments: Capacitive User Tracking and Proactive Fizzy Control", publications 7-9; IEEE; 20 pages; dated 2007.

\* cited by examiner

COHERENCY DETECTION AND INFORMATION MANAGEMENT SYSTEM

BACKGROUND

Some computing devices are configured to present information to a user. A user may request information from the computing device and the computing device may present the information upon receiving the request from the user. Some computing devices may present the information to a user without taking into account the user's individual preferences, and may present the same information to different users. For example, a computing device may receive a request for the local news from two different users and may present the same news information to both users. Likewise, a computing device may present the same information to a user at different times during the day. For example, a computing device may receive a request for the weekend weather forecast from the same user in the morning and in the afternoon and may present the same information in response to both requests.

SUMMARY

In one example, a method may include determining, by a computing device and based on at least one user coherency factor, a user coherency level. The coherency level may include a predicted ability of a user to comprehend information. The method may also include determining, by the computing device and based on the user coherency level, information having a complexity that satisfies the predicted ability of the user to comprehend information. The method may further include outputting, by the computing device, at least a portion of the information.

In another example, a device may include at least one processor, an output component, and a storage component configured to store a coherency detection module and an information management module. The coherency detection module may be executable by the at least one processor to determine, based on at least one user coherency factor, a user coherency level, wherein the user coherency level includes a predicted ability of a user to comprehend information. The information management module may be executable by the at least one processor to determine, based on the user coherency level, information having a complexity that satisfies the predicted ability of the user to comprehend information, and output, via the output component, at least a portion of the information associated with the user coherency level.

A computer-readable storage device may include instructions that, when executed, configure one or more processors to determine, based on at least one user coherency factor, a user coherency level. The user coherency level includes a predicted ability of a user to comprehend information. The computer-readable storage device may include instructions that further configure one or more processors to determine, based on the user coherency level, information having the complexity that satisfies the predicted ability of the user to comprehend information, and output at least a portion of the information.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing device to automatically present information to a user. For example, the computing device may determine a user coherency level and determine what information to output to the user given the user coherency level. Because different users may have different user coherency levels, or an individual user's coherency level may change throughout the day, the computing device may present information based on the individual user's coherency level at the time the computing device outputs the information.

In various instances, techniques of this disclosure may enable a computing device to determine a complexity of information that corresponds to the user coherency level. In other words, the computing device may determine whether the user is coherent enough to understand more complex information or whether computing device should output less complex information. In some instances, the computing device may determine a type of information to output based on the complexity of the information corresponding to the user coherency level and/or contextual information. In some instances, for a given type of information, the computing device may determine a level of detail for the information given the user coherency level. For instance, if the computing device determines that the computing device should output sports information, the computing device may determine whether to output a summary (e.g., teams and scores) or whether to output more detailed information about a game (e.g., game highlights, player and team statistics, etc.). In this way, the computing device may automatically determine information to present to a user while also dynamically adjusting the type and level of detail of the information provided to a user.

Figure 1:
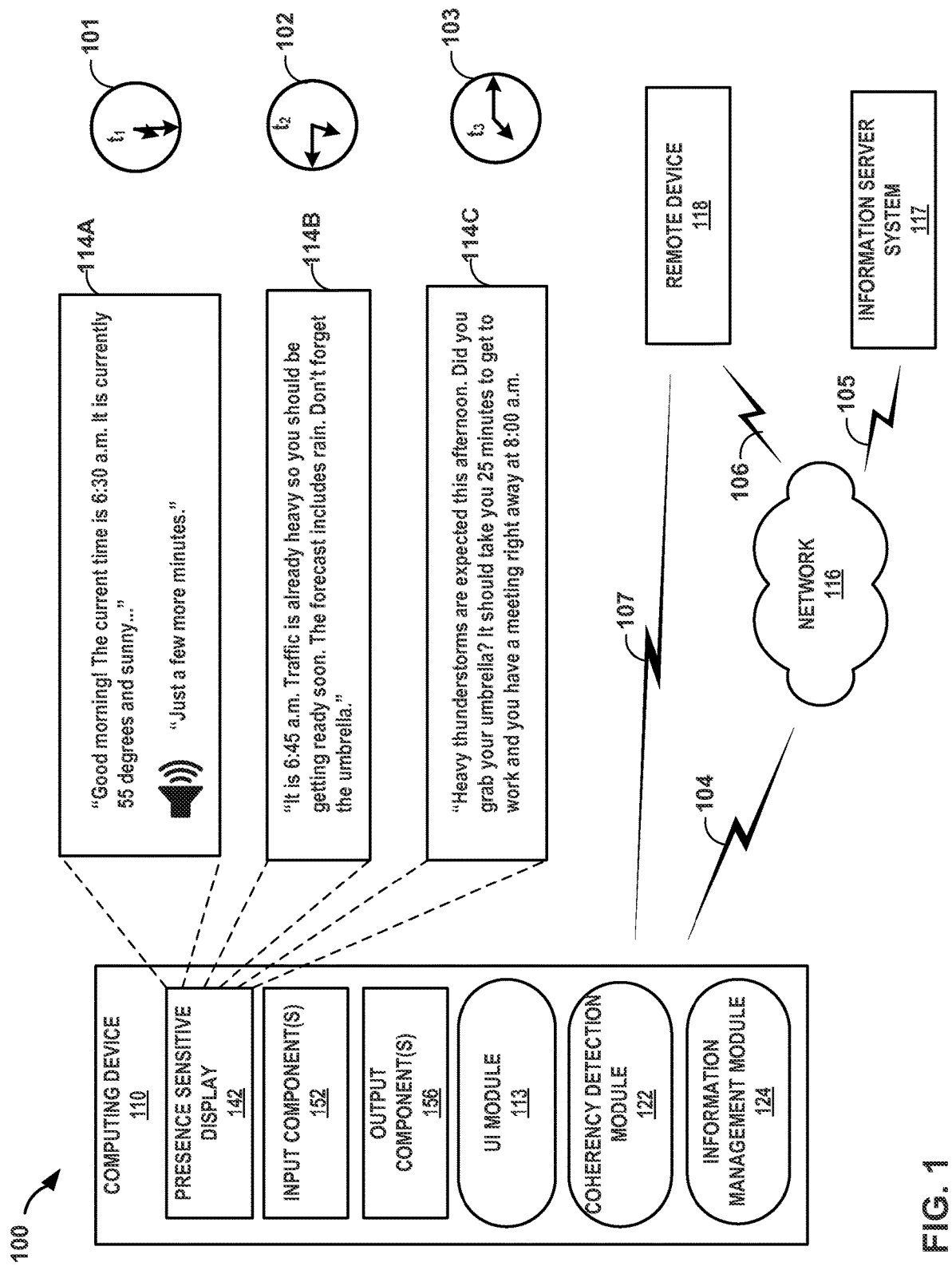
FIG. 1 is a conceptual diagram illustrating as an example system for outputting information associated with a user coherency level, in accordance with one or more aspects of the present disclosure.

FIG. 1 is a conceptual diagram illustrating system 100 as an example system for outputting information associated with a user coherency level, in accordance with one or more aspects of the present disclosure. System 100 includes computing device 110, information server system ("ISS") 117, and remote device 118 that are communicatively coupled via network 116.

Remote device 118 is one example of a computing device, such as a smart phone, a computerized wearable device (e.g., a watch, eyewear, ring, necklace, etc.), speaker, television, automobile, or any other type of computing device configured to send and receive information via a network, such as network 116. Remote device 118 includes one or more media applications for outputting information, such as audio data or visual data. Remote device 118 may exchange information with computing device 110 via network 116. For example, remote device 118 may send information to computing device 110 and may output information received from computing device 110. Remote device 118 may also exchange information with computing device 110 without traversing network 116, for example, using direct link 107. Direct link 107 may be any network communication protocol or mechanism capable of enabling two computing devices to communicate directly (i.e., without requiring a network switch, hub, or other intermediary network device), such as Bluetooth®, Wi-Fi Direct®, near-field communication, etc.

Computing device 110 may represent a mobile device, such as a smart phone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, or any other types of wearable and non-wearable computing devices configured to send and receive information via a network, such as network 116.

Computing device 110 includes a presence sensitive display (PSD) 142, one or more input components 152, one or more output components 156, user interface (UI) module 113, coherency detection module (CDM) 122, and information management module (IMM) 124. Modules 113, 122, and 124 may perform operations described using software, hardware, firmware, or a mixture of hardware, software, and firmware residing in and/or executing at computing device 110. Computing device 110 may execute modules 113, 122, and 124 with multiple processors or multiple devices. Computing device 110 may execute modules 113, 122, and 124 as virtual machines executing on underlying hardware. Modules 113, 122, and 124 may execute as one or more services of an operating system or computing platform. Modules 113, 122, and 124 may execute as one or more executable programs at an application layer of a computing platform.

PSD 142 of computing device 110 may function as respective input and/or output devices for computing device 110. PSD 142 may be implemented using various technologies. For instance, PSD 142 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 142 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 142 may receive tactile input from a user of respective computing device 110. PSD 142 may receive indications of tactile input by detecting one or more gestures from a user (e.g., the user touching or pointing to one or more locations of PSD 142 with a finger or a stylus pen). PSD 142 may output information to a user as a graphical user interface (e.g., screenshots 114A-114C, collectively "screenshots 114"), which may be associated with functionality provided by computing device 110. For example, PSD 142 may present various user interfaces (e.g., screenshots 114) related to information alerts or other features of computing platforms, operating systems, applications, and/or services executing at or accessible from computing device 110 (e.g., electronic message applications, Internet browser applications, mobile or desktop operating systems, etc.).

Input components 152 may include touchscreen technologies, microphone technologies, optical sensor technologies, infrared sensor technologies, or other input device technology for use in receiving input signals. Input signals may include user inputs (e.g., speech, touch), optical signals (e.g., visible light, infrared light), or other signals that may be received by computing device 110.

Output components 156 may include display technologies, speaker technologies, haptic feedback technologies, or other output device technology for use in outputting information to a user. Output components 156 may output audio signals to a user, for instance using a speaker. Output components 156 may output visual signals to a user, for instance using a display device.

UI module 113 manages user interactions with PSD 142, input component(s) 152, output component(s) 156, and other components of computing device 110. UI module 113 may cause PSD 142 to output a user interface, such as screenshots 114 for display, as a user of computing device 110 views output and/or provides input at PSD 142. UI module 113 may receive one or more indications of input from a user as the user interacts with the user interfaces (e.g., PSD 142 or input components 152), at different times and when the user and computing device 110 are at different locations. UI module 113 may interpret inputs detected at PSD 142 and input components 152 and may relay information about the detected inputs to one or more associated platforms, operating systems, applications, and/or services executing at computing device 110, for example, to cause computing device 110 to perform functions.

UI module 113 may receive information and instructions from one or more associated platforms, operating systems, applications, and/or services executing at computing device 110 and/or one or more remote computing systems, such as ISS 117 and/or remote device 118. In addition, UI module 113 may act as intermediaries between the one or more associated platforms, operating systems, applications, and/or services executing at computing device 110, various output devices of computing device 110 (e.g., speakers, LED indicators, audio or electrostatic haptic output device, etc.) to produce output (e.g., a graphic, a flash of light, a sound, a haptic response, etc.) with computing device 110.

ISS 117 represents any suitable remote computing system, such as one or more desktop computers, laptop computers, mainframes, servers, cloud computing systems, etc. capable of sending and receiving information both to and from a network, such as network 116. ISS 117 may host applications and data for contextual information, music, weather information, traffic information, messaging information (e.g., email, SMS), calendar information, social media, news, etc. In some examples, ISS 117 hosts (or at least provides access to) speech-to-text services (STT) and text-to-speech services (TTS). ISS 117 may represent a cloud computing system that provides information through network 116 computing device 110 and/or remote device(s) 118, which may output a least a portion of the information provided by ISS 117 to a user. In some examples, one or more modules 113, 122, or 124 may interact with ISS 117, such as requesting contextual information.

Network 116 represents any public or private communications network, for instance, cellular, Wi-Fi, and/or other types of networks, for transmitting data between computing systems, servers, and computing devices. Network 116 may include one or more network hubs, network switches, network routers, or any other network equipment, that are operatively inter-coupled thereby providing for the exchange of information between computing device 110, ISS 117, and remote device 118. Computing device 110, ISS 117, and remote device 118, may transmit and receive data across network 116 using any suitable communication techniques. For example, ISS 117 may exchange data with computing device 110 via a cellular network and computing device 110 may exchange data with remote device 118 via Wi-Fi.

Computing device 110, ISS 117, and remote device 118 may each be operatively coupled to network 116 using respective network links 104, 105, and 106. Computing device 110, ISS 117, and remote device 118 may be operatively coupled to network 116 using a different network link. The links coupling computing device 110, ISS 117, remote device 118 to network 116 may be Ethernet, ATM or other types of network connections, and such connections may be wireless and/or wired connections.

In accordance with techniques of this disclosure, system 100 may automatically determine a user coherency level for a user and output information to the user based on the user coherency level. For example, IMM 124 may determine whether to output information, when to output information, and/or what information to output.

CDM 122 may determine a user coherency level in order to determine what information computing device 110 should output. In some examples, the user coherency level includes an estimated coherency of the user (e.g., how coherent or alert is the user) and a corresponding predicted ability of the user to comprehend information (e.g., what can the user comprehend given how coherent the user is). CDM 122 may determine the user coherency level based on at least one user coherency factor, such as user input, sensor data, or a behavior history of the user. Because a user's coherency level may change throughout the day, CDM 122 may determine the user coherency level at any time of day or throughout the day. In some examples, CDM 122 may determine the user coherency level as part of a user wakeup routine, and may determine the user coherency level before, during, and/or after computing device 110 outputs a signal indicative of an alarm. For example, if computing device 110 has not output a signal indicative of an alarm, CDM 122 may determine that the user is probably still asleep and that the user coherency level is low. In some examples, if computing device 110 has output a signal indicative of an alarm, CDM 122 may determine the user coherency level based on a response (or lack thereof) from the user. For example, if the user responded to the alarm by pressing the snooze button, CDM 122 may determine that the user is at least partially asleep and that the user coherency level is low.

IMM 124 may determine whether to output information or determine a preferred time to output information. IMM 124 may determine whether or when to output the information based on the user coherency level. For example, if the user coherency level is very low, IMM 12 may determine that computing device 110 should refrain from outputting information. In some examples, if the user coherency level satisfies a threshold user coherency level, IMM 124 may determine when computing device 110 should output information and determine what information computing device 110 should output. IMM 124 may determine information associated with the user coherency level. For example, IMM 124 may determine what information to output based on a data label that indicates the complexity of the information, the source of the information, or a user coherency profile that specifies information that the user typically requests when at a particular user coherency level or that a population of users typically request when at a particular coherency level.

In some examples, IMM 124 may determine a complexity of information associated with the user coherency level. For example, if the user coherency level is high, IMM 124 may determine that the complexity of information associated with the user coherency level is high and that computing device 110 should output complex information. If the user coherency is low, IMM 124 may determine that the complexity of information associated with the user coherency level is low and computing device 110 should output less complex information.

IMM 124 may, in some examples, determine a type of information based on the complexity of information associated with the user coherency level. For example, IMM 124 may determine a type of information having a complexity that satisfies the predicted ability of the user to comprehend information. The type of information may include news, weather, traffic, sports, calendar event reminders, stock quotes, or any other type of information. In some examples, a given type of information may be associated with a particular complexity. For example, if IMM 124 determines that the user coherency level is associated with a high complexity level, IMM 124 may determine that computing device 110 should output a type of information associated with a high complexity level (e.g., financial information, news, etc.). In other words, if the predicted ability of the user to comprehend information is high, IMM 124 may determine a type of information with a high complexity level. If IMM 124 determines that the user coherency level is associated with a low complexity level, IMM 124 may determine that computing device 110 should output a type of information associated with a low complexity level (e.g., music, social media, etc.).

IMM 124 may determine a type of information to output based on contextual information. Contextual information may include information associated with users of computing devices and may be stored at computing device 110, ISS 117, and/or remote device 118. When computing devices store contextual information associated with individual users or when the information is genericized across multiple users, all personally-identifiable-information such as name, address, telephone number, and/or e-mail address linking the information back to individual people may be removed before being stored. Computing device 110, ISS 117, and/or remote device 118 may further encrypt the information to prevent access to any information stored therein. In addition, computing devices may only store information associated with users of computing devices if those users affirmatively consent to such collection of information. The computing devices may further provide opportunities for users to withdraw consent and in which case, the computing devices may cease collecting or otherwise retaining the information associated with that particular user.

As used throughout the disclosure, the term "contextual information" is used to describe information that can be used by a computing system and/or computing device, such as computing device 110 or ISS 117, to define one or more environmental characteristics associated with computing devices and/or users of computing devices. In other words, contextual information represents any data that can be used by a computing device and/or computing system to determine a "user context" indicative of the circumstances that form the experience the user undergoes (e.g., virtual and/or physical) for a particular location at a particular time.

Examples of contextual information include past, current, and future physical locations, degrees of movement, magnitudes of change associated with movement, weather conditions, traffic conditions, patterns of travel, patterns of movement, application usage, calendar information, purchase histories, Internet browsing histories, and the like. Contextual information may also include communication information such as information derived from e-mail messages, text messages, voice mail messages or voice conversations, calendar entries, task lists, social media network related information, and any other information about a user or computing device that can support a determination of a user context.

In some examples, IMM 124 may determine a type of information based on contextual information such as the time of day. For example, IMM 124 may determine that computing device 110 should output weather and/or traffic information in the morning. In some instances, IMM 124 may determine a type of information based on contextual information such as user browsing and/or application history. For example, IMM 124 may determine a type of information based on the types of information the user or a group of similar users typically requests.

In some examples, computing device 110 may determine a level of detail associated with the user coherency level. For example, IMM 124 may determine the level of detail of information having a complexity that satisfies the predicted ability of the user to comprehend information. In some examples, if the type of information includes the weather, IMM 124 may determine whether to output a low level of detail (e.g., the current temperature) or output more detailed information (e.g., temperature, humidity, and possibility of rain each hour for the next eight hours). IMM 124 may determine the information to output based on the type of information and level of detail associated with the user coherency level. In some examples, IMM 124 may determine that computing device 110 should output different levels of detail for different types of information.

Computing device 110 may output a subset of the information associated with a user coherency level. In some examples, IMM 124 may determine a subset of information having a complexity that satisfies the predicted ability of the user to comprehend information. For example, if the user coherency level is low, IMM 124 may determine a large amount of data having a low complexity and may determine a subset of the information to output. IMM 124 may determine a subset of the information to output based on contextual information. For example, IMM 124 may determine a subset of the information having a low complexity based on historical user interactions with computing device 110, user preferences, time of day, or any other piece of contextual information. In some examples, IMM 124 may determine that information having a low complexity includes social media information and may determine a subset of information that includes social media information from a particular social media application based on how often the user uses one or more social media applications. Further, in some examples, IMM 124 may determine that computing device 110 should output only a portion of the subset of information. Continuing the example of social media information, IMM 124 may determine that computing device 110 should output the most recent information or information associated with certain contacts. As another example, IMM 124 may determine that a subset of information having a particular complexity level includes traffic and sports information, and may determine that computing device 110 should output only a portion of the subset of information (e.g., traffic) based on contextual information (e.g., time of day).

In operation, in some examples, computing device 110 may be configured to wake the user using an alarm and output information to the user. The alarm may be set by the user or may be automatically set by computing device 110. Computing device 110 may automatically set the alarm based on an email, calendar event, reminder, or other data source indicating the user should be awake. Computing device 110 may output a signal indicative of the alarm in order to wake the user. For example, computing device 110 may vibrate, output an audio signal, display a visual indication of the alarm, etc. In some examples, computing device 110 may output an audio signal indicative of the alarm such a series of beeps or music. Additionally or alternatively, IMM 124 may determine information to output. As described above, IMM 124 may determine the information based on contextual information and/or the user coherency level.

In some examples, where computing device 110 is configured to output a signal indicative of an alarm and computing device 110 has not output an indication of the alarm, CDM 122 may determine that the user is probably still asleep and has a low coherency level. Based on the user coherency level, IMM 124 may determine at least one type of information having a complexity that satisfies the predicted ability of the user to comprehend information, such as the current time, weather, or sports. IMM 124 may determine that a low coherency level is associated with a low level of detail. In some examples, IMM 124 may determine that the information associated with a low coherency level includes a brief, easy to understand statement of the time, weather, and sports updates. IMM 124 may cause computing device 110 to output at least a portion of the information. Thus, at time ($t_1$) 101, as illustrated by screenshot 114A in FIG. 1, IMM 124 may cause computing device 110 to output the information "Good morning! The current time is 6:30 a.m. It is currently 55 degrees and sunny . . . "

As illustrated in FIG. 1 the user may interrupt the output by saying "Just a few more minutes." CDM 122 may receive the user input and may estimate that user is not very coherent and will not be able to comprehend information very well. As a result, IMM 124 may cause computing device 110 to stop outputting information.

CDM 122 may determine that the user coherency level has changed from a first user coherency level to a second user coherency level. IMM 124 may determine updated information associated with the second user coherency level and may output at least a portion of the updated information. As illustrated by screenshots 114 in FIG. 1, IMM 124 may determine different information at time ($t_2$) 102 than determined at time ($t_1$) 101, and may cause computing device 110 to output the different information at time ($t_2$) 102. For example, at time ($t_1$) 101, IMM 124 may determine a type of information and a level of detail for that type of information that is associated with a first (e.g., low) user coherency level. However, IMM 124 may determine a second (e.g., higher) user coherency level based on at least one user coherency factor. For example, computing device 110 may detect light via a sensor, detect a pulse via a heart rate sensor (e.g., if the user puts on a wearable device), or detect movement of the computing device via a motion sensor. As a result, CDM 122 may determine that the user coherency level has changed and IMM 124 may determine updated information associated with the second user coherency level.

In some instances, IMM 124 may determine that the type of information may change and/or the level of detail of the information should change. For instance, if IMM 124 determines that the user coherency level has increased, IMM 124 may determine that computing device 110 should output at least one different type of information and/or should include more detail than was previously output. As illustrated by screenshot 114B, in some examples, computing device 110 may output traffic at time ($t_2$) 102 in addition to the time and weather output by computing device 110 at time ($t_1$) 101. Thus, IMM 124 may cause computing device 110 to output the message "It is 6:45 a.m. Traffic is already heavy so you should be getting ready soon. The forecast includes rain. Don't forget the umbrella."

CDM 122 may continue to update the user coherency level based on at least one user coherency factor and IMM 124 may determine updated information associated with the updated user coherency level. At time ($t_3$) 103, CDM 122 may determine that the user coherency level has increased since time ($t_2$) 102. In some examples, IMM 124 may determine that computing device 110 should output information with a greater level of detail because the user coherency level has increased. IMM 124 may determine that computing device 110 should output the same type of information as output at time ($t_2$) 102 (i.e., traffic and weather), but that the information should include more detail than was output at time ($t_2$) 102. Thus, as illustrated by screenshot 114C of FIG. 1, IMM 124 may cause computing device 110 to output the message "Heavy thunderstorms are expected this afternoon. Did you grab your umbrella? It should take 25 minutes to get to work and you have a meeting right away at 8:00 a.m."

Determining a user coherency level and outputting information, as described above, may also be used to determine a user's coherency level at any time of day. For example, computing device 100 may determine the coherency level of a user as the day progresses, determine the coherency level of a user if the user has been engaged in activities that may diminish mental acuity (e.g., taking medication) or engaged in other activities that may affect the user's coherency level.

Techniques of this disclosure may enable a computing device to present information to a user that is more suited to the coherency level of a user. By determining the coherency level of the user, techniques of this disclosure may enable a computing device to determine a complexity of information associated with the user coherency level. The techniques of this disclosure may enable a computing device to determine a type of information and a level of detail for information that the user will be more likely to comprehend given the current coherency level of the user. By determining what information the user is likely to comprehend and automatically outputting the information, techniques of this disclosure may enable a computing device to improve the information output by the computing device.

Figure 2:
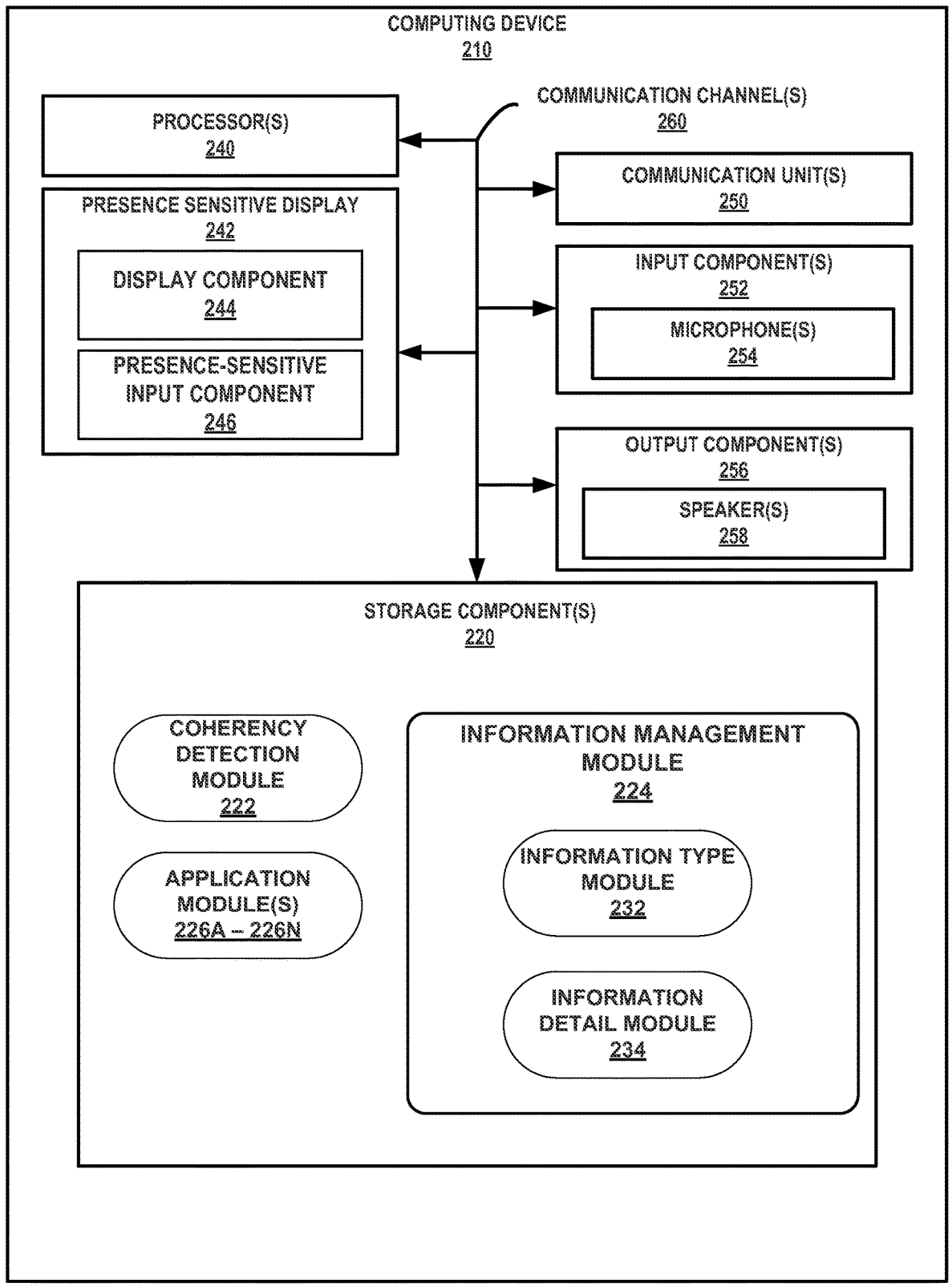
FIG. 2 is a conceptual diagram illustrating a computing device for outputting information associated with a user coherency level, in accordance with one or more aspects of the present disclosure.

FIG. 2 is a conceptual diagram illustrating computing device 210 as an example computing device for outputting information associated with a user coherency level, in accordance with one or more aspects of the present disclosure. Computing device 210 of FIG. 2, in some examples, represents an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes one or more processors 240, PSD 242, one or more communication units 250, one or more input components 252, one or more output components 256, and one or more storage components 220. PSD 242 includes display component 244 and presence-sensitive input component 246. One or more storage components 220 of computing device 210 are configured to store coherency detection module 222, information management module 224, and application modules 226A-226N (collectively, application modules 226). Communication channels 260 may interconnect each of the components 220, 222, 224, 226, 232, 234, 240, 242, 244, 246, 250, 252, 254, 256, and 258 for inter-component communications (physically, communicatively, and/or operatively). In some examples, communication channels 260 may include a system bus, a network connection, an inter-process communication data structure, or any other method for communicating data.

One or more input components 252 of computing device 210 may receive input. Examples of input are tactile, audio, image and video input. Input components 252 of computing device 210, in one example, includes a presence-sensitive display, touch-sensitive screen, mouse, keyboard, voice responsive system, a microphone 254 or any other type of device for detecting input from a human or machine. In some examples, input components 252 include one or more sensor components such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, a still camera, a video camera, a body camera, eyewear, or other camera device that is operatively coupled to computing device 210, infrared proximity sensor, hygrometer, and the like).

One or more output components 256 of computing device 210 may generate output. Examples of output are tactile, audio, still image and video output. Output components 256 of computing device 210, in one example, includes a presence-sensitive display, sound card, video graphics adapter card, speaker 258, cathode ray tube (CRT) monitor, liquid crystal display (LCD), or any other type of device for generating output to a human or machine.

One or more communication units 250 of computing device 210 may communicate with external devices via one or more wired and/or wireless networks by transmitting and/or receiving network signals on the one or more networks. For example, communication units 250 may be configured to communicate over a network with ISS 117 to process text or speech input, or exchange information with remote applications. Modules 222, 224, and/or 226 may receive, via communication units 250, from IS S 117 or remote device 118, data associated with a user coherency level. Likewise, modules 222, 224, and/or 226 may send, via communication units 250, to ISS 117 or remote device 118, information associated with a user coherency level. Examples of communication unit 250 include a network interface card (e.g. such as an Ethernet card), an optical transceiver, a radio frequency transceiver, a GPS receiver, or any other type of device that can send and/or receive information. Other examples of communication units 250 may include short wave radios, cellular data radios, wireless network radios, as well as universal serial bus (USB) controllers.

PSD 242 of computing device 210 includes display component 244 and presence-sensitive input component 246.

Display component 244 may be a screen at which information is displayed by PSD 242 and presence-sensitive input component 246 may detect an object at and/or near presence-sensitive input component 246. As one example range, presence-sensitive input component 246 may detect an object, such as a finger or stylus that is within two inches or less of display component 244. Presence-sensitive input component 246 may determine a location (e.g., an [x, y] coordinate) of display component 244 at which the object was detected. In another example range, presence-sensitive input component 246 may detect an object six inches or less from display component 244 and other ranges are also possible. Presence-sensitive input component 246 may determine the location of display component 244 selected by a user's finger using capacitive, inductive, and/or optical recognition techniques. In some examples, PSD 242 also provides output to a user using tactile, audio, or video stimuli as described with respect to display component 244. In the example of FIG. 2, PSD 242 may present a user interface (such as a notification graphical user interface as shown in screenshots 114 of FIG. 1, a graphical user interface associated with one or more application modules 226, and/or a notification center graphical user interface, or any other type of graphical user interface).

While illustrated as an internal component of computing device 210, PSD 242 may also represent and an external component that shares a data path with computing device 210 for transmitting and/or receiving input and output. For instance, in one example, PSD 242 represents a built-in component of computing device 210 located within and physically connected to the external packaging of computing device 210 (e.g., a screen on a mobile phone). In another example, PSD 242 represents an external component of computing device 210 located outside and physically separated from the packaging or housing of computing device 210 (e.g., a monitor, a projector, etc. that shares a wired and/or wireless data path with computing device 210).

Presence-sensitive display 242 of computing device 210 may receive tactile input from a user of computing device 210. PSD 242 may receive indications of the tactile input by detecting one or more tap or non-tap gestures from a user of computing device 210 (e.g., the user touching or pointing to one or more locations of PSD 242 with a finger or a stylus pen). PSD 242 may present output to a user. PSD 242 may present the output as a graphical user interface (e.g., as screen shots 114 from FIG. 1), which may be associated with functionality provided by various functionality of computing device 210. For example, PSD 242 may present various user interfaces of components of a computing platform, operating system, applications, or services executing at or accessible by computing device 210 (e.g., an electronic message application, a navigation application, an Internet browser application, a mobile operating system, etc.).

PSD 242 of computing device 210 may detect two-dimensional and/or three-dimensional gestures as input from a user of computing device 210. For instance, a sensor of PSD 242 may detect a user's movement (e.g., moving a hand, an arm, a pen, a stylus, etc.) within a threshold distance of the sensor of PSD 242. PSD 242 may determine a two or three dimensional vector representation of the movement and correlate the vector representation to a gesture input (e.g., a hand-wave, a pinch, a clap, a pen stroke, etc.) that has multiple dimensions. In other words, PSD 242 can detect a multi-dimension gesture without requiring the user to gesture at or near a screen or surface at which PSD 242 outputs information for display. Instead, PSD 242 can detect a multi-dimensional gesture performed at or near a sensor which may or may not be located near the screen or surface at which PSD 242 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 222, 224, and 226 may be operable by processors 240 to perform various actions, operations, or functions of computing device 210. For example, processors 240 of computing device 210 may retrieve and execute instructions stored by storage components 220 that cause processors 240 to perform the operations associated with modules 222, 224, and 226. The instructions, when executed by processors 240, may cause computing device 210 to store information within storage components 220.

One or more storage components 220 within computing device 210 may store information for processing during operation of computing device 210 (e.g., computing device 210 may store data accessed by modules 222, 224, and 226 during execution at computing device 210). In some examples, storage component 220 is a temporary memory, meaning that a primary purpose of storage component 220 is not long-term storage. Storage components 220 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 220, in some examples, also include one or more computer-readable storage media. Storage components 220, in some examples, include one or more non-transitory computer-readable storage mediums and/or one or more computer-readable storage devices. Storage components 220 may be configured to store larger amounts of information than typically stored by volatile memory. Storage components 220 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 220 may store program instructions and/or information (e.g., data) associated with modules 222, 224, and 226. Storage components 220 may include a memory configured to store data or other information associated with modules 222, 224, and 226.

One or more application modules 226 may each perform various functions or provide access to one or more services accessed by computing device 210 (e.g., executing in a cloud computing environment). Each of application modules 226 may execute at as part of an operating system, platform, or other operating environment associated with computing device 210. Additionally, one or more application modules 226 may provide a graphical user interface (GUI) as part of their execution. For example, application modules 226 may cause PSD 242 to display a respective graphical user interface. Examples of application modules 226 include: a notification service or a notification center from which information associated with a notification is presented and/or accessible, a communication or messaging application (e.g., for performing e-mail, text-based, telephone, voicemail, instant messaging, video chat, or other telecommunication related functions for computing device 210), a game application, an Internet browser application, a calendar application, a social media application, a map or navigation application, or any and all other types of applications that provide graphical content for display.

In accordance with the techniques of this disclosure, computing device 210 may be configured to output information to that corresponds to a user coherency level. Computing device 210 may be configured to determine when to output information, determine a user coherency level, and determine what information to output based on the user coherency level.

CDM 222 may determine the user coherency level based on at least one user coherency factor. In some examples, the user coherency factor may include a user input, such as an audio input, touch input, or proximity input. For example, the user may speak a command or dictate a message, press a physical button or a virtual button on a touchscreen, or perform a hand movement over PSD 242 (e.g., a movement in proximity to PSD 242 without touching presence-sensitive input component 246). Different types of user input may be associated with different user coherency levels. For example, a proximity input may be associated with a low user coherency, such that if a user silences an alarm by waving a hand over the screen, CDM 222 may determine that the user coherency level is low. In some examples, audio input or touch input may be associated with a higher user coherency level than a proximity input.

The user coherency factor may include the length and/or complexity of the user input. For example, computing device 210 may receive a short audio input (e.g., "Play music") and CDM 222 may determine that the user coherency level is low. In some examples, computing device 210 may receive user input that is long and complex (e.g., typing or dictating an email with several sentences) and CDM 222 may determine that the user coherency level is high. Where the user input is long but not complex, or complex but not long, CDM 222 may determine that the user coherency level is a medium level. In some examples, the user coherency factor may include the accuracy of the user input. For example, if computing device 210 receives inaccurate input (e.g., the user inputs a short password incorrectly), CDM 222 may determine that the user coherency level is low. However, if computing device 210 receives accurate input (e.g., the user types a sentence with no spelling or grammatical errors), CDM 222 may determine that the user coherency level is higher.

The user coherency factor may include sensor data from a computing device (e.g., computing device 210 or remote device 118). In some instances, sensor data may include data regarding one or more environmental conditions associated with computing device 210 or a user of computing device 210, such as ambient light, sound, or movement. For instance, a computing device may include ambient light sensors to detect the amount or type of light, a microphone to detect background noise, or a sensor to detect movement near the computing device. In some instances, remote device 118 may detect the one or more environmental conditions and send a signal indicating the environmental conditions to computing device 210 via communication unit 250. CDM 222 may determine the user coherency level based on the sensor data. For example, CDM 222 may determine that the user coherency level has increased in response to an ambient light sensor detecting an increased level of ambient light, a microphone detecting increased background noise, or a motion sensor detecting motion.

In some examples, CDM 222 may determine the user coherency level based on the intensity of the environmental condition sensed by a sensor. For example, if a sensor (e.g., a microphone) receives audio input from a particular source (e.g., the user's voice), CDM 222 may determine that the user coherency level is higher than if the sensor receives audio input from multiple sources (e.g., from multiple voices). For instance, input from multiple sources may indicate the user is involved in conversation or in a distracting environment. In some examples, CDM 222 may determine the user coherency level based on the type of the environmental condition sensed by a sensor. For example, if a sensor (e.g., a microphone) detects user speech, CDM 222 may determine that the user coherency level is higher than if the sensor detects music (e.g., from speaker 258). For instance, if the sensor detects speech from the user, CDM 222 may determine that the user is requesting information from computing device 210. However, if a sensor detects music, CDM 222 may determine that the user is likely to be distracted by the music.

In some examples, environmental conditions data may include user activity data, such as user movement or user vital signs. For example, a computing device (e.g., computing device 210 or remote device 118) may include an accelerometer to measure movement of the computing device, a sensor to monitor the heart rate of the user, or a microphone to detect breathing. CDM 222 may determine the user coherency level based on the user activity data. For example, if a microphone detects that the user is snoring (i.e., breathing is obstructed while sleeping), CDM 222 may determine that the user coherency level is low. In some examples, CDM 222 may determine that the user coherency level has changed in response to a sensor detecting a signal indicative of a user's body movement (e.g., an accelerometer detecting motion of the computing device or a heart rate monitor detecting a change in the user's heart rate).

In some examples, the user coherency factor may include data from a plurality of sensors from computing device 210 and/or remote device 118. For example, if computing device 210 senses a low level of light at an optical sensor and does not sense any sound at microphone 254, CDM 222 may determine that the user is not awake and that the user coherency level is low. In some examples, if computing device 210 senses a high level of light at an optical sensor and an accelerometer in remote device 118 (e.g., a watch) detects movement, CDM 222 may determine that the user is awake and moving and that the user coherency level is higher.

The user coherency factor may include, in some examples, a behavior history of the user. The behavior history of the user may be stored on computing device 210, ISS 117, or remote device 118. Computing device 210, ISS 117, or remote device 118 may include privacy controls for user information in the behavior history, such as the privacy controls described for contextual information. In some examples, the behavior history of the user may include the user's prior interactions with computing device 210. For example, the behavior history may include the number of times the user typically snoozes an alarm, or the typical timing and/or complexity of user inputs to computing device 210. The behavior history of the user may include information regarding the typical movement of computing device 210 or remote device 118. In some examples, the behavior history may include information for typical connections between computing device 210 and remote devices 118. For example, the behavior history may indicate that computing device 210 typically pairs with a remote device (e.g., an automobile) at certain time (or within a certain window of time), which may indicate a certain user coherency level (e.g., driving may be associated with a higher user coherency level).

In some examples, the user coherency factor may include contextual information. For example, CDM 222 may determine the user coherency level based on calendar information. For instance, the user's calendar may indicate that the user is in a meeting or has an upcoming meeting very soon. Based on the calendar information, CDM 22 may determine that the user is likely to be focused on the meeting and that the user coherency level is low. In some examples, contextual information may include information about an application module 226 running on computing device 210. For example, if a music application or navigation application is active on computing device 210, CDM 222 may determine that the user is likely focused on some activity (e.g., driving) and that the user coherency level is low.

CDM 222 may determine the user coherency level based on a single user coherency factor or a combination of user coherency factors. CDM 222 may determine the user coherency level based on different coherency factors throughout the day. For example, early in the morning, CDM 222 may determine the user coherency level based on a combination of factors such as movement of computing device 210 and the length of user input. In some examples, in the afternoon, CDM 222 may determine the user coherency level based on complexity of user input. In the evening, in some examples, CDM 222 may determine the user coherency level based on the light sensed by an optical sensor and the accuracy of the user input.

CDM 222 may determine the user coherency level based on different coherency factors for different days of the week. In some instances, CDM 222 may determine the user coherency level based on the behavior history of the user during the workweek. For instance, the behavior history of the user may indicate that the user typically snoozes the alarm clock several times each morning, moves around the house during a certain window of time, and connects computing device 210 to an automobile via Bluetooth at another time. In some instances, during the afternoon on a weekend, CDM 222 may determine the user coherency level based on movement of computing device 210 or remote device 118, and during the evening or weekend, CDM 222 may determine the user coherency level based on the accuracy and complexity of user input.

In some examples, CDM 222 may determine the user coherency level by weighing a plurality of user coherency factors. For example, CDM 222 may determine the user coherency level based on user input and sensor data, and may give user input more weight than sensor data. For instance, if a user is exercising, sensors may detect a high level of ambient light and a large amount of movement of computing device 210, which may indicate a high user coherency level. However, a touchscreen may receive sporadic and inaccurate input at a lock-screen, which may indicate a low user coherency level. Because, in this example, CDM 222 gives user input more weight than the sensor data, CDM 222 may determine that the user coherency level is low. In some examples, CDM 222 may give more weight to a subset of user coherency factors within a class of user coherency factors. For example, where the class of user coherency factors includes user input, CDM 222 may give more weight to tactile user input than audio user input. For instance, consider an example where a user attempts to unlock computing device 210 by typing a passcode incorrectly and then attempts to unlock the computing device by speaking a passcode correctly. Typing an incorrect passcode may indicate a low user coherency level and speaking a passcode correctly may indicate a high user coherency level. Because, in this example, CDM 222 gives tactile user input more weight than audio user input, CDM 222 may determine that the user coherency level is low.

IMM 224 may determine whether to output information, when to output information, and what information to output. In some examples, IMM 224 may include an information type module (ITM) 232 and an information detail module (IDM) 234. ITM 232 may determine a type of information to output. IDM 234 may determine the level of detail for the information to output.

IMM 224 may determine whether or when to output information based on the user coherency level. For example, if the user coherency level indicates that the predicted ability of the user to comprehend information is low, IMM 224 may determine that computing device 210 should not output information. IMM 224 may determine that computing device 210 should output information only if the user coherency level satisfies a threshold level. In some examples, IMM 224 may determine that computing device 210 should output information when the user coherency level changes by a threshold amount or threshold percentage from an earlier user coherency level.

IMM 224 may determine whether or when to output information based on contextual information. For example, IMM 224 may determine when to output information at a time associated with a calendar event. For example, if a calendar event indicates the user intends to attend an activity in the evening (e.g., a child's baseball game), IMM 224 may determine to output traffic information alerting the user when the user should leave. In some examples, IMM 224 may determine an updated time to output information based on contextual information. For example, if a weather application 226 indicates snow in the forecast or a travel application indicates the departure time for a user's flight has been moved to an earlier time, IMM 224 may determine that computing device 210 should output information at a time that allows the user to get to the activity.

In some examples, IMM 224 may determine the type of information to output based on contextual information. Contextual information may include the urgency of the information. For instance, ITM 232 may determine that certain types of information are more urgent than other information and IDM 234 may determine which details are most important for a certain type of urgent information. For example, if a user has a flight or meeting early in the morning, ITM 232 may determine that computing device 210 should output information about that event. IDM 234 may determine the specific details that computing device 210 should output based on the user coherency level. For example, if the user coherency level is low, IDM 234 may determine that the appropriate information includes place and time. In addition, IMM 224 may determine that computing device 210 should remind the user of urgent events and repeat urgent information.

In some examples, IMM 224 may determine the information to output based on the user coherency level determined by CDM 222. IMM 224 may determine a complexity of information associated with the user coherency level determined by CDM 222. For example, a high user coherency level may correspond to a high complexity of information and a lower user coherency level may correspond to a lower complexity of information. IMM 224 may determine a type of information or level of detail of information having a complexity that satisfies the predicted ability of the user to comprehend information. For example, ITM 232 may determine a type of information based on the complexity of information associated with the user coherency level. In some instances, for a given type of information, IDM 234 may determine the level of detail of information associated with the user coherency level.

IMM 224 may determine what information is associated with the user coherency level based on a data label that indicates the complexity of the information. In some instances, a data label may indicate the complexity of the type of information and/or the complexity of the details of the information. ITM 232 may determine whether the data label corresponds to a type of information that includes the complexity of information associated with the user coherency level. For instance, information may include a data label indicating the type of information is complex (e.g., a detailed article discussing a particular stock in the stock market) and ITM 232 may determine that the information corresponds to a complexity associated with a high user coherency level. In some instances, information may include a data label indicating the type of information is less complex (e.g., a weather report) and ITM 232 may determine that the information corresponds to a complexity associated with a lower user coherency level. In some examples, information may include a data label that indicates the complexity of certain details in the information. IDM 234 may determine which details are associated with the user coherency level based on the data label. For example, information may include a data label that specifies certain details are associated with a low user coherency level (e.g., the forecasted high temperature for the day) and specifies that other details are associated with a higher user coherency level (e.g., the hourly forecast at specific times of the day).

In some examples, IMM 224 may determine the information associated with the user coherency level based on the source of the information. For example, ITM 232 may determine that certain types of application modules 226 are associated with a particular complexity of information. In some examples, applications 226 that do not require much user concentration may be associated with less complex information while applications 226 that require the user to focus more may be associated with more complex information. For instance, ITM 232 may determine that information from a first website or application (e.g., music or social media) corresponds to a first complexity of information and that information from a second website or application (e.g., financial reporting or traffic) corresponds to a second complexity of information.

IMM 224 may determine the information associated with the user coherency level based on a coherency profile. In some examples, the user coherency profile specifies information that a particular user typically requests when at a particular user coherency level. For example, IMM 224 may determine that the user coherency profile for a given user indicates that first information corresponds to a first user coherency level and that second information corresponds to a second user coherency level. In an example where the information includes traffic information, a user coherency profile may indicate that the user typically requests an estimated travel time for a typical route to work when the user has a low coherency level. However, the user coherency profile may indicate that the user typically requests an estimated travel time for alternate traffic routes when the user has a higher coherency level. As a result, IMM 224 may determine that computing device 210 should output a summary of the traffic when the user has a low coherency level (e.g., shortly after waking) and output several route options with estimated driving time when the user has a higher coherency level (e.g., when the user is about to leave for work).

In some examples, the coherency profile may specify information that a population of users typically request when at a particular user coherency level. For example, IMM 224 may determine that the user coherency profile for a population of users indicates that first information corresponds to a first user coherency level and that second information corresponds to a second user coherency level. In an example where the information includes sports information, a user coherency profile for a population of users may indicate a population of users typically request sports information when at a low coherency level. However, the user coherency profile may indicate a population of users typically request news information when at a higher coherency level. As a result, IMM 224 may determine that computing device 210 should output the score of a game when the user has a low coherency level, but should output news information when the user has a higher coherency level.

In some examples, IMM 224 may determine whether to output information via output component 256 of computing device 210 or whether to output information via a remote device 118. IMM 224 may determine that the information is more appropriate for one device over another. For example, IMM 224 may determine that the information associated with the user coherency level includes video data and may send the information to remote device 118 (e.g., a TV) via communication unit 250. In some examples, IMM 224 may determine which device should output the information based on the proximity of computing device 210 to the user and/or remote device 118. For example, if a sensor of remote device 118 indicates that a user is wearing the remote device (e.g., a heart rate monitor of a watch) and the connection between computing device 210 and remote device 118 indicates that the user is not near computing device 210, IMM 224 may send the information to remote device 118 via communication unit 250.

Figure 3:
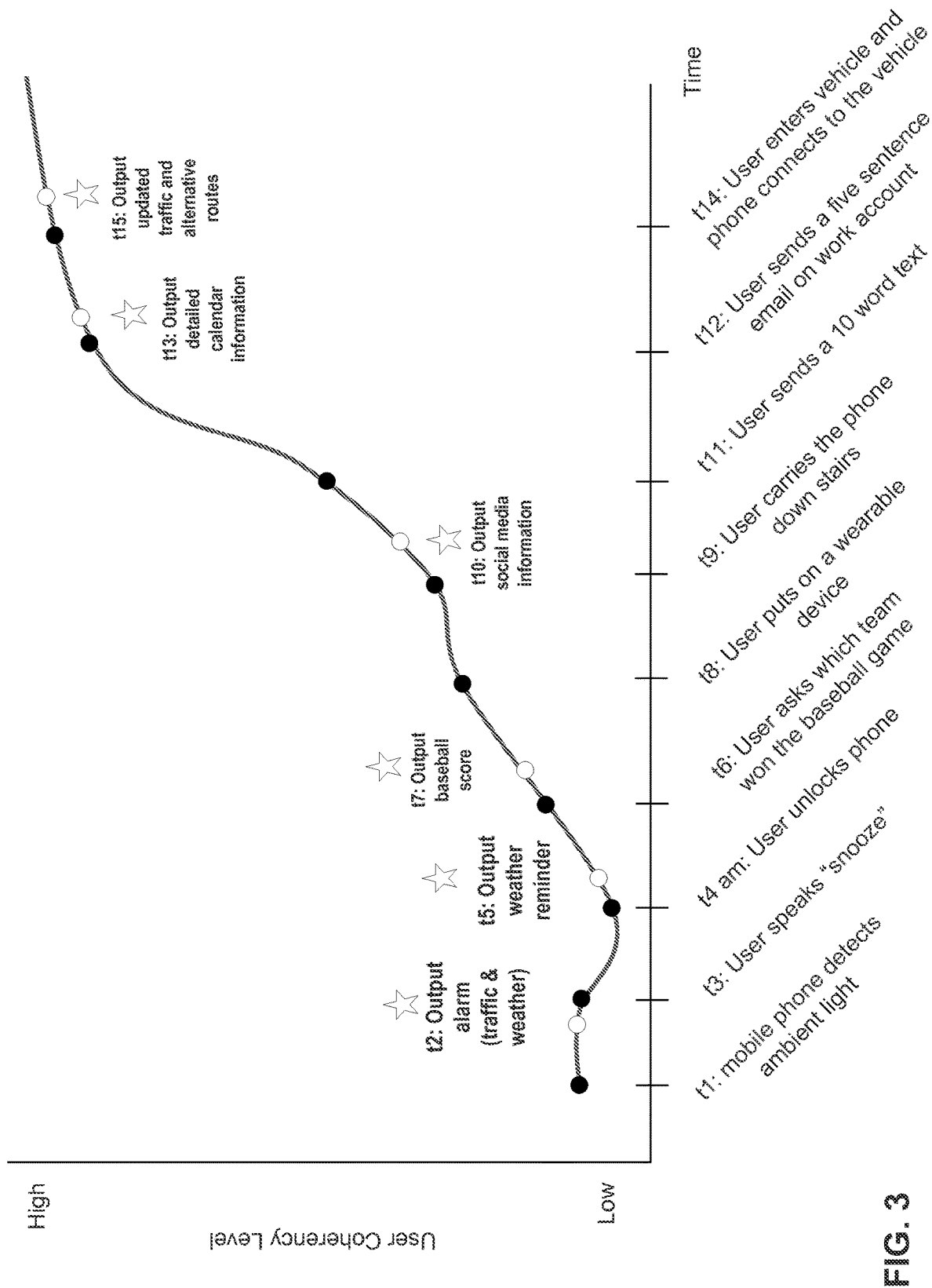
FIG. 3 is a conceptual diagram illustrating an example timeline for an example computing device to output information associated with a user coherency level, in accordance with one or more aspects of the present disclosure.

FIG. 3 is a conceptual diagram illustrating an example timeline for an example computing device to output information associated with a user coherency level, in accordance with one or more aspects of the present disclosure. For purposes of illustration only, FIG. 3 is described below within the context of computing device 210 where computing device 210 is a smart phone. However, computing device 210 may be any type of computing device, as described above.

The example timeline of FIG. 3 follows a scenario that occurs between times $t_1$ and $t_{15}$. Computing device 210 may determine when to output information, determine the user coherency level, and determine what information to output based on the user coherency level.

In some examples, at time $t_1$, an ambient light sensor of computing device 210 may detect ambient light. CDM 222 may determine a user coherency level based user coherency factors such as the amount of light and calendar events (e.g. an alarm set for time $t_2$). Even though computing device 210 detects light, CDM 222 may determine that the user coherency level is low if the level of light is low and computing device 210 is not scheduled to output a signal indicating an alarm until time $t_2$. Based on the low user coherency level, IMM 224 may determine that computing device 210 should output basic information for an alarm, such as the time, traffic, and forecast for the day. Thus, at time $t_2$, computing device 210 may output an audio message including the information determined by IMM 224. At time $t_3$, the user may interrupt the alarm by speaking a brief message such as "Snooze." Computing device 210 may receive the user input and CDM 222 may determine the user coherency level based on the user input and a behavior history of the user. For example, the behavior history of the user may indicate that the user typically snoozes the alarm at least twice in the morning. In the illustrated example, CDM 222 may determine that the user coherency level has decreased because the user input included a command to snooze the alarm and the behavior history of the user indicates that the user typically snoozes the alarm at least twice. As a result, IMM 224 may determine that computing device 210 should not output any information until the user coherency level satisfies a threshold user coherency level.

In the example of FIG. 3, at time $t_4$, computing device 210 may receive a user input to unlock computing device 210. The user input may include an audio input, touch input, or proximity input (e.g., waving a hand over PSD 242). For example, the user may unlock computing device 210 by entering a password on a keyboard. In this example, CDM 222 may determine the user coherency level based on the accuracy of the user input. If the user accurately enters the password, CDM 222 may determine that the user coherency level has increased. IMM 224 may determine whether (or when) to output information based on the user coherency level and/or contextual information. In the illustrated example, CDM 22 may determine that the user coherency level has increased, but that the user coherency level is still low. Based on the increased user coherency level, IMM 224 may determine that computing device 210 should output an audio message at time $t_5$ reminding the user of the forecast for the day.

Continuing with the example illustrated in FIG. 3, at time $t_6$ computing device 210 may receive a user input indicating a request for information about a baseball game the previous night. CDM 222 may determine the user coherency based on user coherency factors such as the length and complexity of the user input. CDM 222 may determine that the user input included a full sentence and included a request for information, which may indicate that the user coherency level has increased. As a result, CDM 222 may determine that the user coherency level has increased. Based on contextual information (e.g., receiving audio input from the user indicating a question from the user) IMM 224 may determine that computing device 210 should immediately output information at time $t_7$ in order to respond to the user's question. IMM 224 may determine a type of information to output based on contextual information and determine a level of detail associated with the updated user coherency level. In some examples, IDM 234 may determine that the level of detail to be output by computing device 210 should include only the score. However, in some examples, if the user coherency level has increased, IMM 224 may cause computing device 210 to output more detailed information, such as the score, winning pitcher, and highlights.

At time $t_8$, the user may interact with a remote device 118, such as putting on a wearable device (e.g., a smartwatch). CDM 222 may determine the user coherency level based on sensors in remote device 118, such as a heart rate monitor, gyroscope, and/or accelerometer. For example, the sensor data may indicate the user has become more active (e.g., an increased heart rate). In the illustrated example, CDM 222 may determine that the user coherency level has increased slightly based on the sensor data from remote device 118. IMM 224 may determine that the user coherency level has not increased beyond a threshold amount. Thus, IMM 224 may determine that computing device 210 should not output any information. At time $t_9$, sensors in computing device 210 may indicate that computing device 210 was moved around the house, down a staircase, and came to rest. Sensors in remote device 118 may indicate that when computing device 210 came to rest, remote device 118 was still moving (e.g. sensors in a watch may indicate arm and wrist movement when the user ate breakfast). Based on the sensor data, CDM 222 may determine that the user coherency has increased to a medium coherency level. IMM 224 may determine that computing device 210 should output information. IMM 224 may determine a type of information to output based on contextual data. For example, contextual data may indicate updates from a social media application. Thus, at time $t_{10}$, IMM 224 may cause computing device 210 to output updates from a social media application 226.

In some examples, at time $t_{11}$, computing device 210 may receive input from the user causing computing device 210 to send a short text message. CDM 222 may determine the user coherency level based on the length and complexity of the user input. In the illustrated example, CDM 222 may determine that the user coherency level has increased from a medium level. In some examples, if the change in the user coherency level does not satisfy a threshold change in the user coherency level, IMM 224 may determine that computing device 210 should not output any information at the current time. At time $t_{12}$, computing device 210 may receive user input causing computing device 210 to send a multi-sentence email from a work email account. Based on the length, complexity, and accuracy of the user input, CDM 222 may determine that the user coherency level has increased to a high level. IMM 224 may determine that computing device 210 should output information based on the change in the user coherency level. The type of information may be based on the user coherency level and contextual information such as the application (e.g., work email application) utilized by the user. For example, IMM 224 may determine that the type of information to be output by computing device 210 includes work calendar information from a calendar application 226. Further, IMM 224 may determine the level of detail of information based on the user coherency level and the type of information. Because the user coherency level is high and the type of information is work related, IMM 224 may determine that computing device 210 should output detailed calendar information (e.g., time, location, and subject matter for morning meetings). Thus, at time $t_{13}$, computing device 210 may output the detailed calendar information.

Computing device 210 may connect to another remote device 118. For example, at time $t_{14}$, the user may enter a vehicle and cause computing device 210 to connect with a vehicle entertainment system (e.g., using Bluetooth). CDM 222 may determine the user coherency level based on a combination of user coherency factors. For instance, CDM 222 may determine that the user coherency level at time $t_{14}$ is high based on the elapsed time since computing device 210 output the alarm, sensor data of computing device 210 and remote device 118 that indicates movement, and complex input received from the user. IMM 224 may determine that computing device 210 should output information based on the user coherency level and determine the information based on contextual information. For example, the contextual information may include the connection between computing device 210 and the vehicle, IMM 224 may determine that computing device 210 should output updated traffic information (e.g., an updated estimate of the travel time) and additional information (e.g., possible alternative routes and estimated travel times for each route). As a result, computing device may output the updated and more detailed traffic information at time $t_{15}$. However, in some examples, if the contextual information indicates the user is driving a vehicle, IMM 224 may determine that computing device 210 should output less detailed information, or should not output any information, so that the user may focus on driving.

Figure 4:
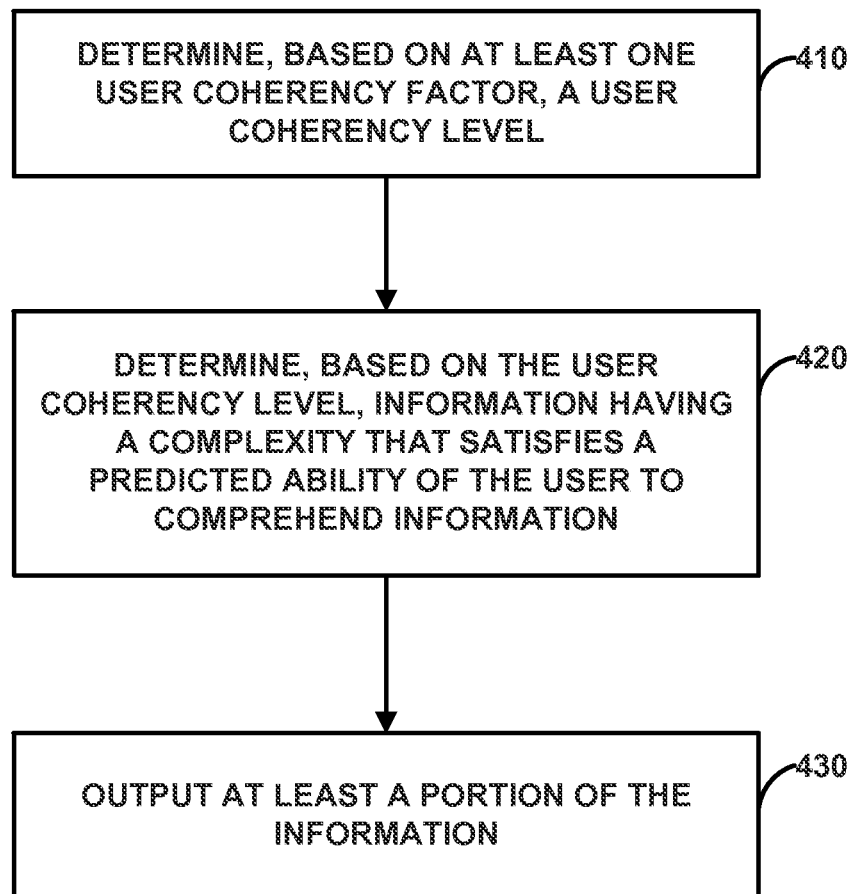
FIG. 4 is a flow diagram illustrating an example operation of the computing device, in accordance with one or more aspects of the present disclosure.

FIG. 4 is a flow diagram illustrating an example operation of the computing device, in accordance with one or more aspects of the present disclosure. The process of FIG. 4 may be performed by one or more processors of a computing device, such as computing device 110 of FIG. 1 and/or computing device of FIG. 2. The steps of the process of FIG. 4 may in some examples, be repeated, omitted, and/or performed in any order. For purposes of illustration, FIG. 4 is described below within the context of computing device 210 of FIG. 2.

CDM 222 may determine, based on at least one user coherency factor, a user coherency level (410). The user coherency factor may include a user input, sensor data, or behavior history of the user. In some examples, user inputs may include audio inputs, touch inputs, or proximity inputs. For example, the user coherency factor may include the length, complexity, or accuracy of the user input. Sensor data may include information from sensors included in computing device 210 or a remote device 118. In some examples, CDM 222 may determine the user coherency level based on one or more user coherency factors. In addition, in some examples, CDM 222 may give different weight to different user coherency factors.

CDM 222 may determine the user coherency level periodically. For example, CDM 222 may determine the user coherency profile at regular intervals during a typical weekday. In some examples, CDM 222 may determine the user coherency level based on different user coherency factors and assign different weights for given user coherency factors at different days and/or times. For example, during the afternoon on a weekday, CDM 222 may determine the user coherency level based multiple user coherency factors (e.g., user input and sensor data). In some examples, on a weekday evening, CDM 222 may determine the user coherency factor based on different user coherency factors or may weigh the user coherency factors differently. For example, CDM 222 may weigh sensor data more heavily than user input in the afternoon, but may weigh user input more heavily than sensor data in the evening.

In some instances, IMM 224 may determine whether computing device 210 should output information, when computing device 210 should output information, and/or what information to output. IMM 224 may determine a complexity of information associated with the user coherency level. IMM 224 may determine information having a complexity that satisfies a predicted ability of the user to comprehend information (420). BIM 224 may determine a type of information to output based on the complexity of information associated with the user coherency level and/or based on contextual information. For a given type of information, IMM 224 may determine a level of detail for the information associated with the user coherency level. In some examples, IMM 224 may determine information associated with the user coherency level based on a data label, the source of information, or a user coherency profile. A data label may indicate the complexity of the information. For example, a data label may indicate the complexity of the type of information and/or the complexity of content of the information. In some examples, different sources of information may be associated with different user coherency levels. A user coherency profile may specify information associated with a coherency level of an individual or information associated with a coherency level of a population of users.

Computing device 210 may output at least a portion of the information associated with the user coherency level (430). IMM 224 may determine which device should output the information. In some examples, IMM 224 may determine that computing device 210 should output the information to a remote device 118 via a communication unit 250 such that remote device 118 may output the information to the user. In some examples, IMM 224 may determine that computing device 210 should output the information directly to the user. IMM 224 may determine whether computing device 210 should output all or only a subset of the information associated with the user coherency level.

Example 1: A method comprising: determining, by the computing device and based on at least one user coherency factor, a user coherency level, wherein the user coherency level includes a predicted ability of a user to comprehend information; determining, by the computing device and based on the user coherency level, information having a complexity that satisfies the predicted ability of the user to comprehend information; and outputting, by the computing device, at least a portion of the information.

Example 2: The method of example 1, wherein determining the information having the complexity that satisfies the predicted ability of the user to comprehend information comprises: determining a type of information associated with the user coherency level; and determining, based on the type of information associated with the user coherency level, the information.

Example 3: The method of any combination of examples 1-2, further comprising: receiving, by an input component of the computing device, a user input, wherein the at least one user coherency factor includes the user input, and wherein determining the user coherency level is based at least in part on the user input.

Example 4: The method of any combination of examples 1-3, further comprising: detecting, by a sensor of a computing device, an environmental condition, wherein the at least one user coherency factor includes the environmental condition, and wherein determining the user coherency level is based at least in part on the environmental condition.

Example 5: The method of any combination of examples 1-4, wherein the at least one user coherency factor includes a behavior history of the user, and wherein determining the user coherency level is based at least in part on the behavior history of the user.

Example 6: The method of any combination of examples 1-5, wherein determining the information having the complexity that satisfies the predicted ability of the user to comprehend information is further based on a data label that indicates the complexity of the information.

Example 7: The method of any combination of examples 1-6, wherein determining information associated with the user coherency level is further based on a coherency profile, the coherency profile specifying information that the user typically requests when at a particular user coherency level.

Example 8: The method of any combination of examples 1-7, wherein determining information associated with the user coherency level is further based on a coherency profile, the coherency profile specifying information that a population of users typically request when at a particular user coherency level.

Example 9: The method of any combination of examples 1-8, further comprising: responsive to determining that the user coherency level has increased: determining, by the computing device, more detailed information having a complexity that satisfies the predicted ability of the user to comprehend information; and outputting, by the computing device, at least a portion of the more detailed information.

Example 10: The method of any combination of examples 1-9, further comprising: determining, by the computing device, that at least a portion of the information having a complexity that satisfies the predicted ability of the user to comprehend information has changed; and outputting, by the computing device, at least a portion of the changed information.

Example 11: A device comprising: at least one processor; an output component; and a storage component configured to store a coherency detection module and an information management module, wherein the coherency detection module is executable by the at least one processor to: determine, based on at least one user coherency factor, a user coherency level, wherein the user coherency level includes a predicted ability of a user to comprehend information; and wherein the information management module is executable by the at least one processor to: determine, based on the user coherency level, information having a complexity that satisfies the predicted ability of the user to comprehend information; and output, via the output component, at least a portion of the information associated with the user coherency level.

Example 12: The device of example 11, wherein the information management module is executable by the at least one processor to determine information having the complexity that satisfies the predicted ability of the user to comprehend information by at least being executable to: determine a type of information associated with the user coherency level; and determine, based on the type of information associated with the user coherency level, the information.

Example 13: The device of any combination of examples 11-12, further comprising: an input component configured to receive a user input, wherein the at least one user coherency factor includes the user input, and wherein the coherency detection module is executable by the at least one processor to determine the user coherency level based at least in part on the user input.

Example 14: The device of any combination of examples 11-13, wherein the at least one user coherency factor includes a behavior history of the user, and wherein the coherency detection module is executable by the at least one processor to determine the user coherency level based at least in part on the behavior history of the user.

Example 15: The device of any combination of examples 11-14, wherein the information management module is executable by the at least one processor to determine information having the complexity that satisfies the predicted ability of the user to comprehend information based on a data label that indicates the complexity of the information.

Example 16: The device of any combination of examples 11-15, wherein the information management module is executable by the at least one processor to determine information having the complexity that satisfies the predicted ability of the user to comprehend information based on a coherency profile, the coherency profile specifying information that the user typically requests when at a particular coherency level.

Example 17: The device of any combination of examples 11-16, wherein the information management module is executable by the at least one processor to determine information having the complexity that satisfies the predicted ability of the user to comprehend information based on a coherency profile, the coherency profile specifying information that a population of users typically request when at a particular coherency level.

Example 18: The device of any combination of examples 11-17, wherein the coherency detection module is further executable by the at least one processor to determine that the user coherency level has increased, wherein, responsive to the coherency detection module determining that the user coherency level has increased, the information management module is further executable by the at least one processor to: determine more detailed information having a complexity that satisfies the predicted ability of the user to comprehend information; and output, via the output component, at least a portion of the more detailed information.

Example 19: The device of any combination of examples 11-18, wherein the information management module is further executable by the at least one processor to: determine that a least a portion of the information having a complexity that satisfies the predicted ability of the user to comprehend information includes changed information; and output, via the output component, at least a portion of the changed information.

Example 20: A computer-readable storage device comprising instructions that, when executed, configure one or more processors to: determine, based on at least one user coherency factor, a user coherency level, wherein the user coherency level includes a predicted ability of a user to comprehend information; determine, based on the user coherency level, information having the complexity that satisfies the predicted ability of the user to comprehend information; and output, at least a portion of the information.

Example 21: A device comprising means for performing any combination of the techniques of examples 1-10.

Example 22: A computer-readable storage medium encoded with instructions that, when executed, cause at least one processor to perform any combination of the techniques of examples 1-10.

Appended to this description is a plurality of claims directed to various embodiments of the disclosed subject matter. It will be appreciated that embodiments of the disclosed subject matter may also be within the scope of various combinations of said claims, such as dependencies and multiple dependencies there between. Therefore, by reference thereto, all such dependencies and multiple dependencies, explicit or otherwise, form a portion of this description.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method implemented by one or more processors, the method comprising:
   at a first time:
     receiving, via an input component of a computing device, first user input from a user of the computing device, the first user input including a request;
     determining, based on at least the first user input received from the user of the computing device, a first user coherency level, wherein the first user coherency level indicates a first predicted ability of the user to comprehend information at the first time, wherein determining the first user coherency level based on at least the first user input received from the user of the computing device comprises determining the first user coherency level based on at least a first accuracy of the first user input received from the user of the computing device;
     determining, based on at least the first user coherency level, first particular information that is responsive to the request included in the first user input, wherein the first particular information has a first level of complexity that satisfies the first predicted ability of the user to comprehend information at the first time; and
     causing, via one or more output components of the computing device, the first particular information to be provided for presentation to the user; and
   at a second time that is subsequent to the first time:
     receiving, via the input component of the computing device, second user input from the user of the computing device, the second user input including the request or an additional request;
     determining, based on at least the second user input received from the user of the computing device, a second user coherency level, wherein the second user coherency level indicates a second predicted ability of the user to comprehend information at the second time,
       wherein determining the second user coherency level based on at least the second user input received from the user of the computing device comprises determining the second user coherency level based on at least a second accuracy of the second user input received from the user of the computing device, and
       wherein the second accuracy of the second user input received from the user of the computing device is more accurate than the first accuracy of the first user input received from the user of the computing device;
     determining, based on at least the second user coherency level, second particular information that is responsive to the request or the additional request included in the second user input, wherein the second particular information has a second level of complexity that satisfies the second predicted ability of the user to comprehend information at the second time, and wherein the second level of complexity is greater than the first level of complexity; and
     causing, via one or more of the output components of the computing device, the second particular information to be provided for presentation to the user.

2. The method of claim 1,
   wherein determining the first user coherency level based on at least the first user input received from the user of the computing device further comprises:
     determining the first user coherency level based on at least a first length of the first user input received from the user of the computing device;
   wherein determining the second user coherency level based on at least the second user input received from the user of the computing device further comprises:
     determining the second user coherency level based on at least a second length of the second user input received from the user of the computing device; and
   wherein the second length of the second user input received from the user of the computing device is greater than the first length of the first user input received from the user of the computing device.

3. The method of claim 2, wherein the second level of complexity is greater than the first level of complexity based on the second length of the second user input received from the user of the computing device being greater than the first length of the first user input received from the user of the computing device.

4. The method of claim 1,
wherein determining the first user coherency level based on at least the first user input received from the user of the computing device further comprises:
determining the first user coherency level based on at least a first type of the first user input received from the user of the computing device;
wherein determining the second user coherency level based on at least the second user input received from the user of the computing device further comprises:
determining the second user coherency level based on at least a second type of the second user input received from the user of the computing device; and
wherein the second type of the second user input received from the user of the computing device differs from the first type of the first user input received from the user of the computing device.

5. The method of claim 4, wherein the second level of complexity is greater than the first level of complexity based on the second type of the second user input received from the user of the computing device differing from the first type of the first user input received from the user of the computing device.

6. The method of claim 5, wherein the second type of the second user input received from the user of the computing device comprises typed input or touch input, and wherein the first type of the first user input received from the user of the computing device comprises spoken input.

7. The method of claim 5, wherein the second type of the second user input received from the user of the computing device comprises spoken input, and wherein the first type of the first user input received from the user of the computing device comprises typed input or touch input.

8. The method of claim 1, wherein the second level of complexity is greater than the first level of complexity based on the second accuracy of the second user input received from the user of the computing device being more accurate than the first accuracy of the first user input received from the user of the computing device.

9. The method of claim 1, wherein causing the first particular information to be provided for presentation to the user via one or more of the output components of the computing device comprises outputting audible content, of the first particular information, via one or more speakers of the computing device.

10. The method of claim 9, wherein causing the second particular information to be provided for presentation to the user via one or more of the output components of the computing device comprises outputting visual content, of the second particular information, via a display of the computing device.

11. The method of claim 1, wherein causing the first particular information to be provided for presentation to the user via one or more of the output components of the computing device comprises outputting visual content, of the first particular information, via a display of the computing device.

12. The method of claim 11, wherein causing the second particular information to be provided for presentation to the user via one or more of the output components of the computing device comprises outputting audible content, of the second particular information, via one or more speakers of the computing device.

13. The method of claim 1, further comprising:
at the second time:
detecting, by the computing device, presence of music;
wherein determining the second user coherency level is further based on detecting the presence of the music.

14. The method of claim 1, wherein the first level of complexity that satisfies the first predicted ability of the user to comprehend information at the first time is further based on a first type of information, of the first particular information, that is responsive to the request.

15. The method of claim 14, wherein the second level of complexity that satisfies the second predicted ability of the user to comprehend information at the second time is further based on a second type of information, of the second particular information, that is responsive to the request or the additional request.

16. The method of claim 1, wherein determining the first particular information based on the first user coherency level comprises:
providing, to a remote system, the first user coherency level and first content that is based on the first user input; and
receiving, from the remote system, the first particular information.

17. The method of claim 16, wherein determining the second particular information based on the second user coherency level comprises:
providing, to the remote system, the second user coherency level and second content that is based on the second user input; and
receiving, from the remote system, the second particular information.

18. A system comprising:
at least one processor; and
memory storing instructions that, when executed by the at least one processor, cause the at least one processor to:
at a first time:
receive, via an input component of a computing device, first user input from a user of the computing device, the first user input including a request;
determine, based on at least the first user input received from the user of the computing device, a first user coherency level, wherein the first user coherency level indicates a first predicted ability of the user to comprehend information at the first time;
determine, based on the first user coherency level, first particular information that is responsive to the request included in the first user input, wherein the first particular information has a first level of complexity that satisfies the first predicted ability of the user to comprehend information at the first time,
wherein the instructions to determine the first user coherency level based on at least the first user input received from the user of the computing device comprise instructions to determine the first user coherency level based on at least a first length of the first user input received from the user of the computing device; and
cause, via one or more output components of the computing device, the first particular information to be provided for presentation to the user; and
at a second time that is subsequent to the first time:
receive, via the input component of the computing device, second user input from the user of the computing device, the second user input including the request or an additional request;

determine, based on at least the second user input received from the user of the computing device, a second user coherency level, wherein the second user coherency level indicates a second predicted ability of the user to comprehend information at the second time,
  wherein the instructions to determine the second user coherency level based on at least the second user input received from the user of the computing device comprise instructions to determine the second user coherency level based on at least a second length of the second user input received from the user of the computing device, and
  wherein the second length of the second user input received from the user of the computing device is greater than the first length of the first user input received from the user of the computing device;

determine, based on the second user coherency level, second particular information that is responsive to the request or the additional request included in the second user input, wherein the second particular information has a second level of complexity that satisfies the second predicted ability of the user to comprehend information at the second time, and wherein the second level of complexity is greater than the first level of complexity; and cause, via one or more of the output components of the computing device, the second particular information to be provided for presentation to the user.

19. A non-transitory computer-readable storage medium storing instructions that, when executed by at least one processor, cause the at least one processor to perform operations, the operations comprising:
  at a first time:
    receiving, via an input component of a computing device, first user input from a user of the computing device, the first user input including a request;
    determining, based on at least the first user input received from the user of the computing device, a first user coherency level, wherein the first user coherency level indicates a first predicted ability of the user to comprehend information at the first time, wherein determining the first user coherency level based on at least the first user input received from the user of the computing device comprises determining the first user coherency level based on at least a first type of the first user input received from the user of the computing device;
    determining, based on the first user coherency level, first particular information that is responsive to the request included in the first user input, wherein the first particular information has a first level of complexity that satisfies the first predicted ability of the user to comprehend information at the first time; and
    causing, via one or more output components of the computing device, the first particular information to be provided for presentation to the user; and
  at a second time that is subsequent to the first time:
    receiving, via the input component of the computing device, second user input from the user of the computing device, the second user input including the request or an additional request;
    determining, based on at least the second user input received from the user of the computing device, a second user coherency level, wherein the second user coherency level indicates a second predicted ability of the user to comprehend information at the second time,
      wherein determining the second user coherency level based on at least the second user input received from the user of the computing device comprises determining the second user coherency level based on at least a second type of the second user input received from the user of the computing device, and
      wherein the second type of the second user input received from the user of the computing device differs from the first type of the first user input received from the user of the computing device;
    determining, based on the second user coherency level, second particular information that is responsive to the request or the additional request included in the second user input, wherein the second particular information has a second level of complexity that satisfies the second predicted ability of the user to comprehend information at the second time, and wherein the second level of complexity is greater than the first level of complexity; and
    causing, via one or more of the output components of the computing device, the second particular information to be provided for presentation to the user.

* * * * *